United States Patent
Schmidt et al.

(10) Patent No.: US 11,541,856 B2
(45) Date of Patent: Jan. 3, 2023

(54) ELECTROPNEUMATIC HANDBRAKE SYSTEM FOR COMMERCIAL VEHICLES WITH SPRING-LOADED PARKING BRAKES

(71) Applicant: WABCO Europe BVBA, Brussels (BE)

(72) Inventors: Thomas Schmidt, Hannover (DE); Julian van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 170 days.

(21) Appl. No.: 16/916,130

(22) Filed: Jun. 30, 2020

(65) Prior Publication Data
US 2021/0001824 A1 Jan. 7, 2021

(30) Foreign Application Priority Data
Jul. 1, 2019 (DE) .................. 10 2019 117 650.6

(51) Int. Cl.
*B60T 8/17* (2006.01)
*B60T 13/38* (2006.01)
(Continued)

(52) U.S. Cl.
CPC .............. *B60T 8/1708* (2013.01); *B60T 7/08* (2013.01); *B60T 7/085* (2013.01); *B60T 8/248* (2013.01);
(Continued)

(58) Field of Classification Search
CPC ... B60T 7/08; B60T 7/085; B60T 7/20; B60T 8/248; B60T 8/323; B60T 13/40;
(Continued)

(56) References Cited

U.S. PATENT DOCUMENTS 2,373,450 A * 4/1945 Boldt .................... B60T 15/041
                                                  303/6.01
4,163,584 A * 8/1979 Koenig .................. B60T 13/38
                                                      303/7
(Continued)

FOREIGN PATENT DOCUMENTS

DE     102006036748 A1    2/2008
DE     102006054433 A1    5/2008
(Continued)

*Primary Examiner* — Robert A. Siconolfi
*Assistant Examiner* — San M Aung
(74) *Attorney, Agent, or Firm* — Leydig, Voit & Mayer, Ltd.

(57) ABSTRACT

An electropneumatic brake system, for a commercial vehicle which is provided for pulling a trailer, includes at least one service brake circuit configured to activate service brake actuators, a parking brake circuit having parking brake actuators on at least one axle, a trailer brake circuit configured to provide a trailer brake pressure at a trailer brake pressure port, and a manually actuatable operating unit in a driver's cab. The manually actuatable operating unit has a first operating element and a second operating element. In the case of actuation of the first operating element when the vehicle is driving, the parking brake actuators are activated and a trailer brake pressure is output at the trailer brake pressure port. In the case of actuation of the second operating element when the vehicle is driving, only a trailer brake pressure is output.

13 Claims, 2 Drawing Sheets

(51) Int. Cl.
  *B60T 7/08* (2006.01)
  *B60T 8/32* (2006.01)
  *B60T 8/24* (2006.01)
  *B60T 13/36* (2006.01)
(52) U.S. Cl.
  CPC .............. *B60T 8/323* (2013.01); *B60T 13/36* (2013.01); *B60T 13/385* (2013.01); *B60T 2240/00* (2013.01); *B60T 2270/82* (2013.01)
(58) Field of Classification Search
  CPC .... B60T 13/403; B60T 13/406; B60T 13/662; B60T 13/683; B60T 15/041
  USPC .......................................................... 303/7
  See application file for complete search history.

(56) References Cited

U.S. PATENT DOCUMENTS

| | | | | |
|---|---|---|---|---|
| 5,226,692 | A | * | 7/1993 | Eberling ............... B60T 15/041 303/14 |
| 2008/0030068 | A1 | | 2/2008 | Bensch |
| 2009/0256416 | A1 | * | 10/2009 | Bensch ................. B60T 13/683 303/17 |
| 2010/0237690 | A1 | * | 9/2010 | Forster .................. B60T 13/263 303/13 |
| 2018/0251111 | A1 | * | 9/2018 | Schnittger ............ B60T 13/263 |
| 2018/0251112 | A1 | * | 9/2018 | Griesser ............... B60T 15/041 |

FOREIGN PATENT DOCUMENTS

| | | |
|---|---|---|
| DE | 102007042316 A1 | 5/2008 |
| DE | 102008014459 A1 | 9/2009 |
| DE | 102008015249 A1 | 9/2009 |
| DE | 102013107503 A1 | 1/2015 |
| EP | 1923286 B1 | 7/2011 |
| EP | 1997700 B1 | 7/2011 |
| EP | 2570316 A1 | 3/2013 |
| EP | 2059425 B1 | 5/2018 |

\* cited by examiner

ELECTROPNEUMATIC HANDBRAKE SYSTEM FOR COMMERCIAL VEHICLES WITH SPRING-LOADED PARKING BRAKES

CROSS-REFERENCE TO PRIOR APPLICATIONS

Priority is claimed to German Patent Application No. DE 10 2019 117 650.6, filed on Jul. 1, 2019, the entire disclosure of which is hereby incorporated by reference herein.

FIELD

The present disclosure relates to an electropneumatic brake system for a commercial vehicle which is provided for pulling a trailer, having at least one service brake circuit for activating service brake actuators, a parking brake circuit having parking brake actuators on at least one axle of the commercial vehicle, a trailer brake circuit for providing a trailer brake pressure at a trailer brake pressure port and a trailer supply pressure at a trailer supply port, and a manually actuatable operating unit in a driver's cab of the commercial vehicle, having a first operating element which is associated with a first channel for providing a first signal and a second operating element which is associated with a second channel for providing a second signal. The disclosure further relates to a corresponding method for controlling the electropneumatic brake system and to a commercial vehicle having such an electropneumatic brake system.

BACKGROUND

In such an electropneumatic brake system, control devices, or modules, are generally provided for controlling the various brake circuits, such as, for example, a central module for the at least one service brake circuit as well as a parking brake module for the parking brake circuit and a trailer control module for the trailer brake circuit.

Such electropneumatic parking brake modules, also called electropneumatic handbrake modules, serve to actuate so-called parking brakes, generally spring-loaded brakes, of a pneumatic brake system for a commercial vehicle.

Spring-loaded brakes can be used as parking brakes and have a spring-loaded brake actuator which applies the brake without pressure so that, in the pressureless state, the vehicle is correspondingly braked. For releasing the spring-loaded brakes, compressed air is applied thereto, so that the spring-loaded brakes are released against the force of the spring.

Such electropneumatic parking brake modules therefore generally have a supply port for connection of a compressed air supply, and at least one spring brake port for connection of at least one spring-loaded brake cylinder. It is thereby conceivable that all the spring-loaded brake cylinders of the commercial vehicle, in particular of the tractor of a tractor/trailer combination, also called a vehicle combination, are connected to a single spring brake port. It is also possible that separate ports are provided therefor.

Such electropneumatic parking brake modules generally use a relay valve to supply the spring brake port and thus the spring-mounted brake cylinder with a volume flow. They further use a bistable valve to maintain the state of the spring-loaded brake cylinder, that is to say either an aerated state or a vented state, in driving operation and/or in the parked state without permanently having to feed current to an electromagnetic valve for this purpose.

Trailers which are connected to the commercial vehicle in order thus to form the vehicle combination generally additionally also have spring-loaded brakes. However, the precise implementation is different in Europe and in North America. While activation of the spring-loaded brakes conventionally takes place directly at the trailer in Europe, namely by means of a so-called push-pull valve, in North America the spring-loaded brakes are engaged by switching off the supply pressure for the trailer. This can also be carried out from the driver's cab.

In Europe, however, in addition to this parking function, supplementary braking is also effected via the parking brake circuit, for example in critical driving situations or when one of the service brake circuits fails. For this purpose, the driver generally actuates the corresponding parking brake switch in the driver's cab, in order thus also to actuate the corresponding brake actuators during driving. Supplementary brakes exist in North America for such functions. In addition, anti jackknifing braking is generally initiated from the driver's cab via a separate operating element, for example an anti jackknifing brake lever.

There is a need to replace this purely mechanical valve by an electrical circuit in order in particular to perform actuation of the parking brake circuit and also of the parking brakes in the trailer electrically.

Such a solution is known, for example, from DE 10 2013 107 503 A1. There is proposed therein an electropneumatic parking brake device for a tractor of a tractor/trailer combination, having at least one parking brake signal transmitter which generates signals corresponding to a driving function and a parking brake function. The signal transmitter is connected to at least one electronic control device which, in dependence on the electrical signals, activates at least one electromagnetic valve of a valve unit which on the one hand is connected via a supply port to a compressed air supply and which on the other hand, in dependence on this activation, outputs pneumatic signals corresponding at least to the driving function and the parking brake function at its output ports, of which a first output port is connected by means of a pneumatic connection to a pneumatic control port of a trailer control module or trailer control valve, of which an output port is connected to a "brake" coupling head, and of which a second output port is connected to spring-loaded brake cylinders of the tractor. It is further provided that a separate electromagnetic valve device is arranged in the pneumatic connection between the first output port of the valve unit and the pneumatic control port of the trailer control module or trailer control valve, wherein, in order to achieve an anti jackknifing braking function for braking the trailer independently of the tractor in response to electrical anti jackknifing signals generated by the parking brake signal transmitter or by a further signal transmitter and corresponding to the anti jackknifing function, a) at least one electromagnetic valve of the valve unit is so activated by the control device that the first output port is connected to the supply port and the second output port is aerated, and b) the electromagnetic valve device is so configured and so activated by the control device or by a further control device that it outputs at the pneumatic control port of the trailer control module or of the trailer control valve a control pressure that is metered in dependence on the anti jackknifing braking signal.

There is further known, from EP 1 997 700 B1 of the present applicant, an actuating device for a brake system of a vehicle, having a service brake provided for driving operation and a parking brake provided for immobilizing the vehicle. The actuating device has a manually actuatable actuating element for actuating the parking brake which can be deflected along a movement path, wherein the actuating device has a plurality of switching states. In a first switching state, the braking action of the parking brake is provided in dependence on the deflection of the actuating element along the movement path, and in a second switching state, the full braking action of the parking brake is provided. The actuating device is further so configured that, in a first mode and when the actuating element is positioned in the first deflection region, in the neutral position or in a so-called third deflection region which is adjacent to the neutral position but spaced apart from the first deflection region and delimited by a so-called third deflection position, it is in the second switching state and, in a second mode and when the actuating element is positioned in the first deflection region, in the neutral position or in the third deflection region, it is in the first switching state. Two different modes in which the actuating device is actuatable are therefore provided.

From EP 2 059 425 B1 there is further known a brake system for a vehicle having a parking brake having an air-flow-boosting valve device for aerating and venting at least one spring-loaded brake cylinder of the parking brake, which brake system comprises at least one electrically actuatable control valve for controlling the air-flow-boosting valve device, an electrical control device, electrically coupled with the electrically actuatable control valve, for controlling the electrically actuatable control valve, and an electrical actuating device, coupled with the control device, for aerating the parking brake. The actuating device has two different switches which each have a release position and an engage position, and possibly a neutral position, for releasing or engaging the parking brake. The anti jackknifing function can additionally be integrated.

There is further known from EP 1 923 286 B1 an electropneumatic brake system for commercial vehicles with a tractor and a trailer, having an electrically activatable test valve device which is suitable for aerating or venting a pneumatic control input of a trailer control valve device independently of the aeration or venting of spring-loaded brake cylinders of the tractor. Connected in series downstream of the test valve device is an electrically activatable anti jackknifing valve device which in a first switching state transmits a control pressure provided by the test valve device to the pneumatic control input of the trailer control valve device and in a second switching state vents the control input of the trailer control valve device.

SUMMARY

In an embodiment, the present invention provides an electropneumatic brake system for a commercial vehicle which is provided for pulling a trailer. The electropneumatic brake system includes at least one service brake circuit configured to activate service brake actuators, a parking brake circuit having parking brake actuators on at least one axle of the commercial vehicle, a trailer brake circuit configured to provide a trailer brake pressure at a trailer brake pressure port and a trailer supply pressure at a trailer supply port, and a manually actuatable operating unit in a driver's cab of the commercial vehicle. The manually actuatable operating unit has a first operating element, which is associated with a first channel for providing a first signal, and a second operating element, which is associated with a second channel for providing a second signal. In the case of actuation of the first operating element when the vehicle is driving, the parking brake actuators are activated and a trailer brake pressure is output at the trailer brake pressure port. In the case of actuation of the second operating element when the vehicle is driving, only a trailer brake pressure is output at the trailer brake pressure port.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

The present disclosure describes electrifying hitherto purely pneumatically controlled parking brakes and thereby integrating further functions. In particular, it is thereby possible to improve operation and increase safety.

The disclosure describes an electropneumatic brake system of the type mentioned at the beginning, wherein, in the case of actuation of the first operating element when the vehicle is driving, the parking brake actuators are activated and a trailer brake pressure is output at the trailer brake pressure port and, in the case of actuation of the second operating element when the vehicle is driving, only a trailer brake pressure is output at the trailer brake pressure port.

The disclosure is based on the finding that a two-channel electropneumatic implementation for the parking brake brings with it particular advantages. The first channel of the operating unit is preferably provided for activating the parking brake circuit in the commercial vehicle, while the second channel is provided for activating the trailer. Via the operating unit having the first and second operating elements, separate setpoint generation is provided for the two channels. Within the scope of the disclosure, the response to actuation of one of the first and second operating elements is dependent on the driving state, that is to say dependent on whether the vehicle is driving or stationary.

Information about whether the vehicle is driving or stationary can be determined, for example, via the velocity information provided at the vehicle bus or in another manner, such as, for example, via wheel-speed sensors or reference velocities. For example, it can be provided that the vehicle is assumed to be stationary when a determined velocity is 3 km/h or less. Alternative models are likewise conceivable here and further functionalities can be implemented.

Safety can also be increased in that the availability of the operating element is improved and in particular is not dependent on the provision of a pneumatic pressure. The corresponding signal provided via the first and second channel is processed differently according to the vehicle state, so that the skills of the vehicle driver, as are required in the case of conventional pneumatic push-pull valves, are not critical in the present implementation.

In a first preferred embodiment it is further provided that, in the case of actuation of the first operating element when the vehicle is stationary, the parking brake actuators are activated and the trailer supply port is vented and, in the case of actuation of the second operating element when the vehicle is stationary, only the trailer supply port is vented. The first operating element is associated with the tractor, while the second operating element is associated with the trailer. This means that, if the driver, when the vehicle is stationary, actuates the first operating element associated with the vehicle, on the one hand the parking brake actuators are activated, that is to say the parking brakes of the vehicle are engaged, and at the same time the trailer supply port is vented, whereby application of parking brakes of the trailer is likewise effected. In this state, the trailer is no longer supplied with supply pressure, so that corresponding parking brakes in the trailer are applied. If, on the other hand, the operator actuates the second operating element, which is associated with the trailer, when the vehicle is stationary, only the trailer supply port is vented, so that, although the parking brakes of the trailer are engaged, those of the tractor remain open. An anti jackknifing function can thereby be implemented. Thus, when the operator wishes to park a vehicle combination with a tractor and a trailer, he does not have to actuate both operating elements; instead, actuation of the first operating element is sufficient to brake the vehicle combination as a whole. Safety is thereby improved since a vehicle driver cannot accidentally brake only the tractor when a trailer is coupled. The trailer can thereby be prevented from unintentionally rolling away.

According to a further preferred embodiment, the electropneumatic brake system comprises a parking brake unit for actuating the parking brake actuators, which parking brake unit is connected to a first compressed air supply and to the first channel for receiving and processing the first signal. The parking brake unit consequently receives compressed air from the first compressed air supply, which in this embodiment is preferably associated with the parking brake circuit. The parking brake unit further receives the first signal. This is to be understood as also including signals derived from the first signal. The parking brake unit can be connected directly to the operating unit by cable, but the first signal can also be provided by the operating unit via a vehicle bus or indirectly via a further module, such as, for example, a central module or the like. The parking brake unit then preferably converts this signal, preferably by means of one or more electropneumatic valves, and correspondingly activates the parking brake actuators, in particular via a parking brake pressure port which is provided in the parking brake unit.

Similarly, there is preferably provided a trailer control unit which is connected to the trailer brake pressure port and to the trailer supply port for providing the trailer brake pressure and the trailer supply pressure, as well as to the second channel for receiving and processing the second signal. In addition, the trailer control unit is preferably connected to a compressed air supply, for example the first compressed air supply, or a separate second or further compressed air supply. The trailer control unit provides both the trailer supply pressure and the trailer brake pressure and preferably has one or more electropneumatic valves for processing the second signal. As already described in relation to the first signal, this is also to include the receiving and processing of signals derived from the second signal. Provision via a direct cabled connection to the operating unit and also indirect provision via a vehicle bus or a further module are likewise also to be included. Both the parking brake unit and the trailer control unit can be equipped with their own electronic control unit, which control units are able to process the first or second signal, respectively.

Alternatively, it is also conceivable that the first and second signals are provided directly and switch corresponding electromagnetic valves directly.

It can further be provided that the parking brake unit and the trailer control unit are integrated in a common control module in the form of a structural unit. The expression "in the form of a structural unit" means in this connection that the parking brake unit and the trailer control unit can be used together as a module. To that end, the parking brake unit and the trailer control unit can be integrated into a common housing or they can also have two separate housings which are fixed to one another, for example flange-mounted or fastened in another way.

It can further be provided that the control module in the form of a structural unit directly or indirectly receives speed signals from at least one wheel sensor for determining the driving or stationary state of the vehicle. Alternatively or in addition, velocity information via a vehicle bus, for example a CAN bus, or transmission output speeds, TCU1 signals, etc. can be used.

In a preferred variant it can be provided that the first and second operating elements are in the form of buttons. Buttons in the present context mean switching elements that have only on/off positions and are not continuous displacement sensors. In such operating elements it can additionally be provided that the corresponding signal-processing unit provides the signal ramped, that is to say with a time-dependent variable. Such ramping can be dependent on the velocity of the commercial vehicle or can also depend on other parameters, such as, for example, a load, a current brake pressure level or the like. Too rapid locking can thereby be prevented.

Alternatively, the first and second operating elements can also be in the form of continuous displacement sensors, so that an operator can set the desired brake pressure himself by corresponding displacement of the displacement sensor.

In a second aspect, a method for controlling an electropneumatic brake system according to one of the preferred embodiments described hereinbefore of an electropneumatic brake system according to the first aspect of the invention, includes the steps: determining a driving state of the commercial vehicle; providing the first signal; and, in response to the first signal being received at a control device: activating the parking brake actuators and outputting a trailer brake pressure at the trailer brake pressure port for the secondary braking of the commercial vehicle or of a vehicle combination comprising the commercial vehicle and a trailer. It will be appreciated that the electropneumatic brake system according to the first aspect and the method according to the second aspect have identical or similar sub-aspects as are set out in particular in the dependent claims. In this respect, reference is made to the above description in its entirety.

Preferably, the method comprises the steps: providing the second signal; and, in response to the second signal being received at a or at the control device: outputting a trailer brake pressure at the trailer brake pressure port for implementing an anti jackknifing braking function. In the case where only the second signal, that is to say the signal for braking of the trailer, is received while the vehicle is driving, preferably only an anti jackknifing braking function is implemented. A parking state of the trailer is not effected thereby; rather, only the nature of the processing of the signal is changed. The functionality of the system as a whole and also the safety of the vehicle is thereby improved.

It is further preferred that the method comprises the steps: determining a stationary state of the commercial vehicle;

providing the first signal; and, in response to the first signal being received at a or at the control device: activating the parking brake actuators and outputting a trailer brake pressure at the trailer brake pressure port for immobilizing the commercial vehicle. Accordingly, in the stationary state, the first signal is interpreted as meaning that the commercial vehicle is parked.

In further preferred embodiments, the method comprises the steps: providing the second signal; and, in response to the second signal being received at a control device: venting the trailer supply port for immobilizing the trailer. If, in a stationary state, only the second signal is received, it is so interpreted that only the trailer supply port is vented. The commercial vehicle, which in this case functions as a tractor, remains unbraked and can be driven away, for example, by a vehicle driver.

According to a third aspect, a commercial vehicle includes an electropneumatic brake system according to one of the preferred embodiments described hereinbefore of an electropneumatic brake system according to the first aspect. It will be appreciated that the electropneumatic brake system according to the first aspect, the method according to the second aspect and the commercial vehicle according to the third aspect have identical or similar sub-aspects as are set out in particular in the dependent claims. In this respect, reference is made to the above description in its entirety for particular embodiments of the commercial vehicle and the advantages thereof.

An embodiment will now be described hereinbelow with reference to the drawings. These are not necessarily intended to represent the embodiment to scale; rather, where expedient for the purpose of illustration, the drawings are in schematic and/or slightly distorted form. With regard to additions to the teaching which follows directly from the drawings, reference is made to the relevant prior art. It should thereby be noted that various modifications and amendments concerning the form and the detail of the embodiment can be made without departing from the general idea of the invention. The features that are disclosed in the description, in the drawings and in the claims can be fundamental for the further development of the invention both individually and in any desired combination. Moreover, any combinations of at least two of the features disclosed in the description, the drawings and/or the claims fall within the scope of the disclosure. The general idea of the invention is not limited to the exact form or detail of the preferred embodiment shown and described hereinbelow or limited to subject matter which would be limited in comparison to the subject matter claimed in the claims. For the sake of simplicity, the same reference signs are used hereinbelow for identical or similar parts or parts having an identical or similar function.

Figure 1:
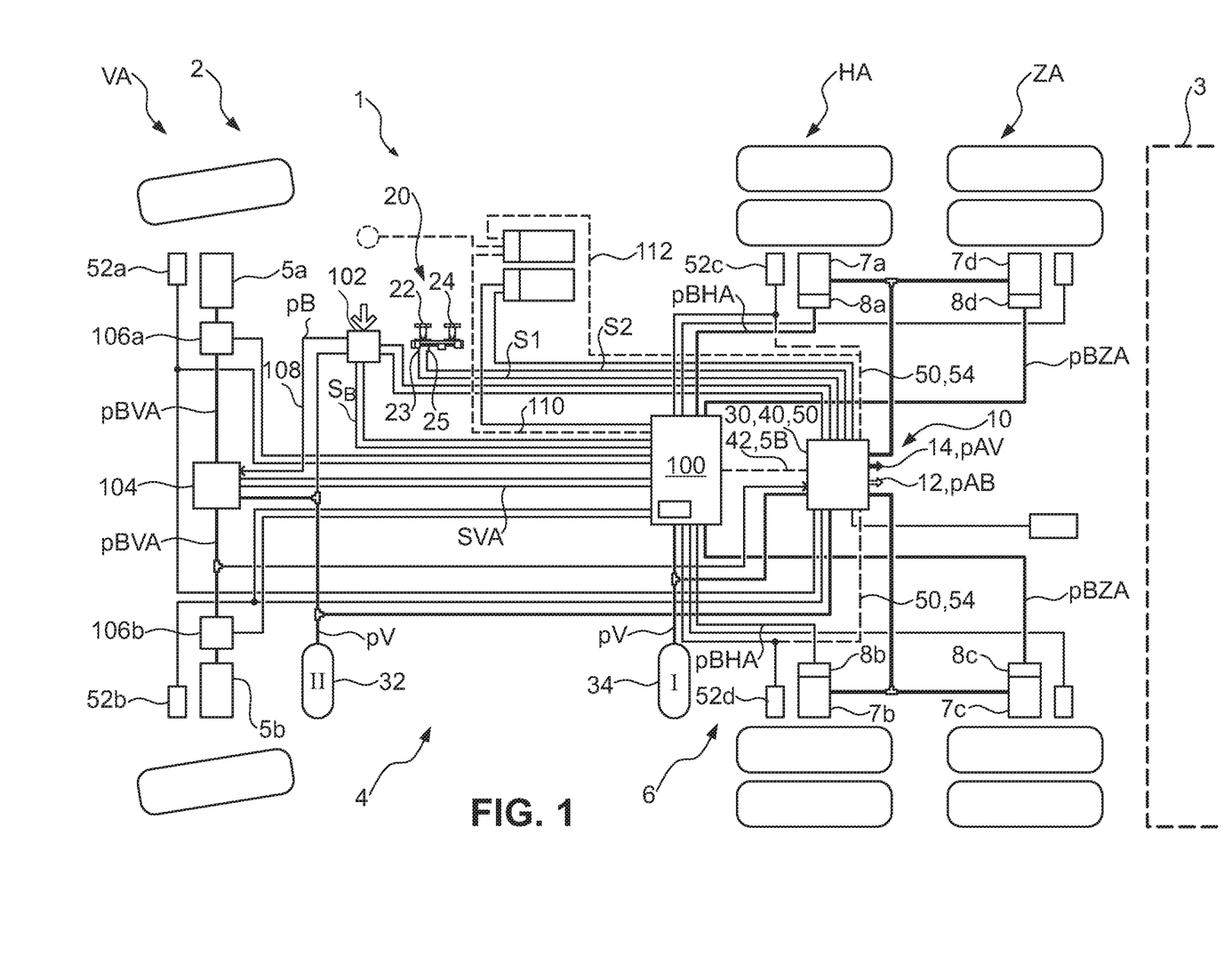
FIG. 1 shows a schematic representation of a layout of an electropneumatic brake system according to a first aspect of the invention.

According to FIG. 1, a layout of an electropneumatic brake system 1 for a commercial vehicle 2 is shown, wherein the commercial vehicle 2 is provided for pulling a trailer 3. The combination of a commercial vehicle 2 and a trailer 3 is also referred to as a vehicle combination.

In this exemplary embodiment, the commercial vehicle 2 has three axles, namely a front axle VA, a rear axle HA and a supplementary axle ZA. In order correspondingly to brake these three axles VA, HA, ZA, the electropneumatic brake system 1 has two brake circuits, namely a service brake circuit 4 and a parking brake circuit 6. Service brake actuators 5a, 5b on the front axle VA, service brake actuators 8a, 8b on the rear axle HA and service brake actuators 8c, 8d on the supplementary axle ZA are controlled via the service brake circuit 4. The service brake actuators 5a, 5b, 8a, 8b, 8c, 8d can be in the form of conventional pneumatic brake actuators with a diaphragm. In the case of service braking, the electropneumatic brake system 1 functions as follows: The service brake circuit 4 is fed via a first compressed air supply 32. This first compressed air supply 32 provides supply pressure pV. For distributing the supply pressure pV that is provided to the corresponding service brake actuators 5a, 5b, 8a, 8b, 8c, 8d, the electropneumatic brake system 1 has a central module 100. The central module 100 is electrically connected to a braking value sensor 102 and receives an electrical braking signal SB therefrom. The central module 100 further receives supply pressure pV from a second compressed air supply 34 with which it is directly connected. The central module 100 is further directly connected both to the service brake actuators 8a, 8b on the rear axle HA and to the service brake actuators 8c, 8d on the supplementary axle ZA. The central module 100 is in this respect in the form of a combined module and comprises an intelligence system for processing the braking signal SB and also one or more electropneumatic valves for processing the supply pressure pV and providing a rear axle brake pressure pHBA or a supplementary brake pressure pBZA to the corresponding service brake actuators 8a, 8b, 8d, 8c of the rear axle HA or supplementary axle ZA. In this respect, the central module 100 also operates a rear axle or supplementary axle modulator.

In order to brake the front axle VA, the central module 100 provides a front axle braking signal SVA to a front axle modulator 104, which receives supply pressure pV from the first compressed air supply 32. The front axle modulator 104 likewise has, in known manner, one or more electropneumatic valves which are controlled either directly via the front axle braking signal SVA or via an electronic system which is provided in the front axle modulator 104. The front axle modulator 104 then correspondingly outputs a front axle brake pressure pBVA to the service brake actuators 5a, 5b of the front axle VA, here still slip-controlled via first and second front axle ABS valves 106a, 106b.

The front axle modulator 104 can also be controlled purely pneumatically, namely via a pneumatic brake pressure pB, which can likewise be provided by the braking value sensor 102 via a pneumatic line 108. In this manner, the front axle VA can also be controlled purely pneumatically.

In order also to brake the trailer 3, the electropneumatic brake system 1 has a trailer brake circuit 10 having a trailer brake pressure port 12 and a trailer supply port 14. The trailer brake pressure port 12 is also referred to as the yellow coupling head or the "brake" coupling head and the trailer supply port 14 is also referred to as the red coupling head or the "supply" coupling head. Supply pressure pAV for the trailer is provided via the trailer supply port 14, while a trailer brake pressure pAB is provided via the trailer brake pressure port 12. The trailer brake pressure pAB is a control pressure which indicates the level of brake pressure for the trailer 3. Both the trailer brake pressure port 12 and the trailer supply port 14 are here connected to a control module 50 in the form of a structural unit, which control module includes functionalities of both a parking brake unit 30 and a trailer control unit 40. For controlling the trailer 3, the functionalities of the trailer control unit 40 are first of interest.

The portion of the control module 50 in the form of a structural unit that comprises the functionalities of the trailer control unit 40 is connected via a bus connection 42 to the central module 100. Via this bus connection 42, the control module 50 in the form of a structural unit receives the braking signal SB and processes it accordingly, in order to provide a corresponding trailer brake pressure pAB at the trailer brake pressure port 12 from the supply pressure pV, which is provided from the second compressed air supply 34 directly to the control module 50 in the form of a structural unit. For this purpose, the control module 50 in the form of a structural unit has one or more electromagnetically switchable valves, which are not shown in detail here. For converting the braking signal SB, the control module 50 in the form of a structural unit has its own intelligence system.

Further details of the service brake system 4 are not described further in detail in the following.

In addition to the service brake circuit 4 and the trailer brake circuit 10, the electropneumatic brake system 1 also comprises the parking brake circuit 6. In this exemplary embodiment, the parking brake circuit 6 is fed from the first compressed air supply 32, but there can also be embodiments in which the parking brake circuit 6 is fed via its own third compressed air supply (not shown here). In the exemplary embodiment shown here, the parking brake circuit 6 is controlled by the control module 50 in the form of a structural unit, and in particular by the portion of the control module 50 in the form of a structural unit that is configured as a parking brake unit 30. It will be appreciated that there can also be embodiments in which the parking brake unit 30 is provided as a separate module. The parking brake circuit 6 here comprises parking brake actuators 7a, 7b on the rear axle HA and parking brake actuators 7c, 7d on the supplementary axle ZA. The parking brake actuators 7a-7d are in the form of so-called spring-loaded brake cylinders, which are open when aerated and are applied as a result of a spring force when vented. In normal driving operation, the parking brake actuators 7a-7d are to be aerated and thus released. The parking brake actuators 7a-7d are used in particular for parking the commercial vehicle 2 as well as for supplementary braking in critical driving situations or for the redundant braking of the rear axle HA and supplementary axle ZA in the event that the service brake circuit 4 fails partially or completely.

For controlling the parking brake circuit 6 there is provided a manually actuatable operating unit 20. In conventional brake systems, this manually actuatable operating unit 20 is in the form of a so-called "push-pull valve", via which the corresponding parking brake actuators 7a-7d and optionally also a trailer 3 can then be controlled pneumatically. The manually actuatable operating unit 20 is purely electronic and has for this purpose a first operating element 22 and a second operating element 24. The first operating element 22 is associated with a first channel 23 and the second operating element 24 is associated with a second channel 25. Both the first and the second operating element 22, 24 are connected via the first and second channels 23, 25 to the parking brake unit 30, or the control module 50 in the form of a structural unit. Via the first and second channels 23, 25, first and second signals S1, S2 are provided to the parking brake unit 30, or the control module 50 in the form of a structural unit. In conventional push-pull valves, two actuating elements such as valve slides are likewise provided, while one is provided for the tractor and the other for the trailer. This logic is fundamentally retained, wherein the first and second signals S1, S2 are interpreted differently by the parking brake unit 30, or the control module 50 in the form of a structural unit, according to the driving situation.

In the case where the commercial vehicle 2 is in a driving state and the vehicle driver actuates the first operating element 22 in order to provide the first signal S1 via the first channel 23, the parking brake actuators 7a, 7b on the rear axle HA and also the parking brake actuators 7c, 7d on the supplementary axle ZA are activated, and a trailer brake pressure pBA is also outputted at the trailer brake pressure port 12, in order both to brake the commercial vehicle 2 by means of the parking brake actuators 7a-7d and to brake the trailer 3 via the normal service brakes of the trailer 3, which are activated on the basis of the trailer brake pressure pAB. Depending on availability, however, it can also be provided that, additionally or alternatively, on provision of the first signal S1, this braking requirement is implemented by service brake actuators 5a, 5b, 8a, 8b, 8c, 8d. Usually, a vehicle driver actuates the first operating element 22 while driving only when supplementary braking or secondary braking is to be initiated, for example in the case of a locked brake pedal. The vehicle driver's wish is thus for supplementary braking, wherein the parking brake actuators 7a-7d are used therefor or, depending on availability, additionally or alternatively also the service brake actuators 5a, 5b, 8a, 8b, 8c, 8d. However, in order at the same time to avoid overrunning of the trailer 3, the trailer is also braked via the service brakes of the trailer 3 by provision of the trailer brake pressure pAB. The particular advantage of the present embodiment is that the parking brake unit 30 and the trailer control unit 40 are provided together in the control module 50 in the form of a structural unit, so that these functionalities are integrated and thus the parking brake actuators 7a-7d and also the trailer 3 can be activated in a simple manner.

If, on the other hand, only the second operating element 24 is actuated by the vehicle driver during driving, in order to provide the second signal S2 via the second channel 25, that second signal S2 is again processed in the control module 50 in the form of a structural unit and only a trailer brake pressure pAB is outputted at the trailer brake pressure port 12. The parking brake actuators 7a-7d are not actuated in this case. In this manner, an anti-jackknifing braking function is performed, in which the trailer 3 is braked via the service brakes of the trailer 3.

If, however, the first and second operating elements 22, 24 are actuated while the commercial vehicle 2 is stationary, the first and second signals S1, S2 are interpreted differently. If the first operating element 22 is actuated while a commercial vehicle 2 is stationary, the parking brake actuators 7a-7d are activated and also the trailer supply port 14 is vented, so that the trailer 3 no longer receives supply pressure. In this manner, the trailer 3 is converted to a parked state. The trailer 3 no longer has supply pressure and service brakes of the trailer 3 can thus no longer function. If, on the other hand, only the second operating element 24 is actuated while the commercial vehicle 2 is stationary, only the trailer supply port 14 is vented. In this manner, only the trailer 3 is braked, while the commercial vehicle 2 can continue to drive.

Depending on the design of the first and second operating elements 22, 24, they can be in the form of buttons or of continuous displacement sensors. In the case of continuous displacement sensors, the operator of the commercial vehicle 2 can himself choose the level of brake pressure and thus a braking action by choosing the position of the displacement sensor. If the first and second operating elements 22, 24 are in the form of buttons, it is preferably provided that ramping routines which ramp the corresponding signal S1, S2 are provided in the parking brake unit 30, or in the control module 50 in the form of a structural unit. This is preferred in particular when the commercial vehicle 2 is in a driving state. In this manner, locking of one or more axles can be prevented.

In order to determine whether the commercial vehicle 2 is in a driving or a stationary state there are provided in this embodiment wheel-speed sensors 52a, 52b, 52c, 52d, which are connected to the central module 100. The wheel-speed sensors 52c, 52d on the rear axle HA are additionally connected by means of additional cabling 54 directly to the parking brake unit 30, or the control module 50 in the form of a structural unit, in order thus to provide speed signals SD directly thereto. It is preferably provided that, when it is determined that the speed of the commercial vehicle 2 is approximately 3 km/h or less, a stationary state is determined.

Alternatively, it can also be provided that the parking brake unit 30, or the control module 50 in the form of a structural unit, receives information about the driving or stationary state of the commercial vehicle 2 from the central module 100 via the bus connection 42, which in turn derives that information from the wheel-speed sensors 52a-52d. Moreover, the central module 100 can be connected to a vehicle bus 110 at which such signals are likewise provided. In addition, it can further be provided that the parking brake unit 30, or the control module 50 in the form of a structural unit, is also connected to the vehicle bus 112. In this manner too, the parking brake unit 30, or the control module 50 in the form of a structural unit, can receive information about the vehicle state.

Figure 2:
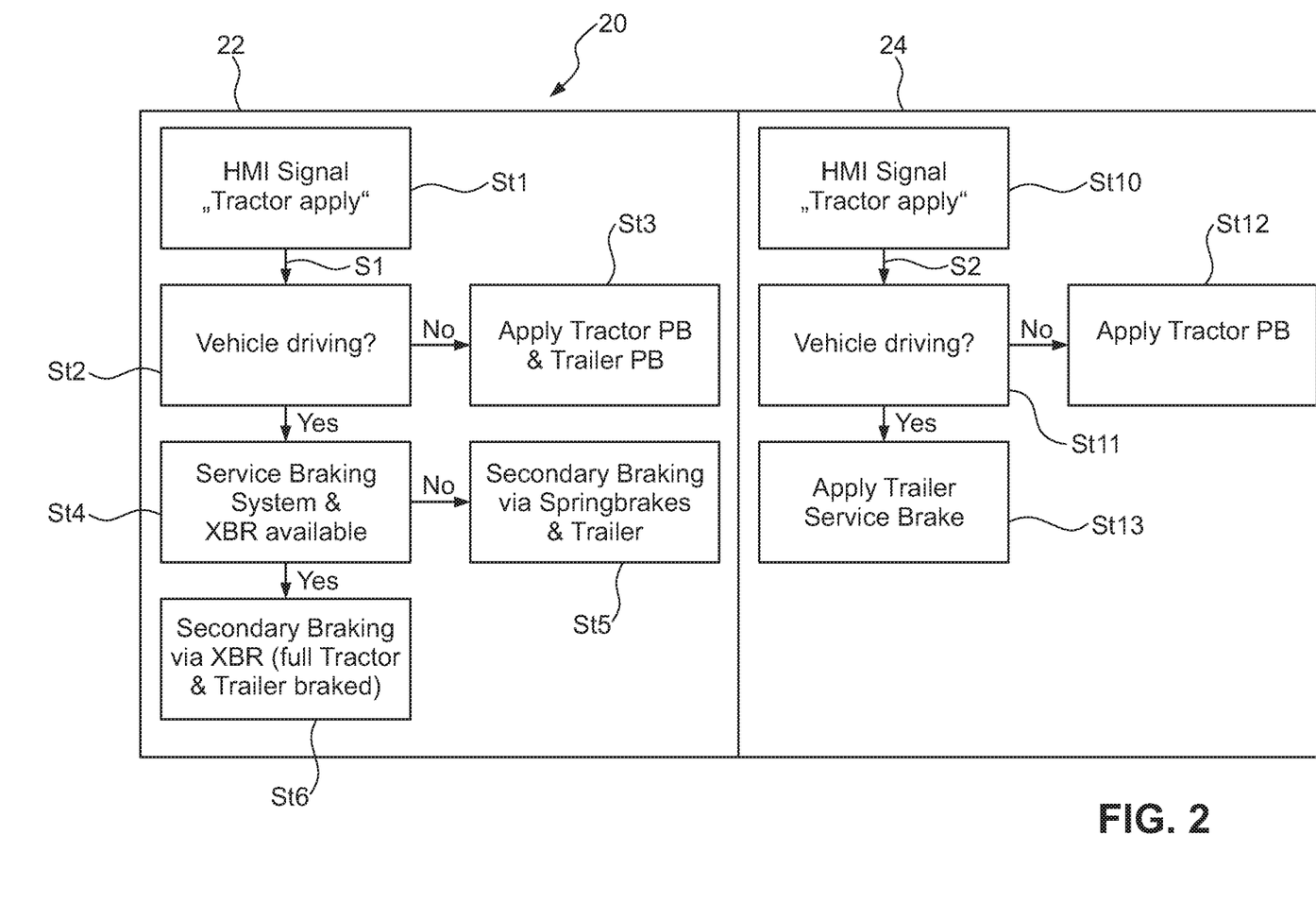
FIG. 2 shows a schematic representation of switching states.

FIG. 2 shows switching routines and ways in which the first and second signals S1, S2, which are provided by means of the first and second operating elements 22, 24, are interpreted.

In the left-hand region of FIG. 2, the first operating element 22 is first considered. In step St1, it is actuated and the signal S1 is provided. In step St2, it is then determined whether the commercial vehicle 2 is driving or stationary. If it is determined that the commercial vehicle 2 is not driving, in a step St3 the parking brake actuators 7a-7d of the commercial vehicle 2 are actuated and also the trailer supply port 14 is vented in order to activate the parking brakes of the trailer 3. If, on the other hand, it is determined in step St2 that the commercial vehicle 2 is in a driving state, it is additionally checked in step St4 whether the service brake system, that is to say the service brake circuit 4, is available and also whether external braking signals from the service brake system are accepted or processed, for example via the vehicle bus 110, 112 ("XPR available"). If that is not the case, secondary braking via the parking brake actuators 7a-7d is performed in step St4 and a trailer brake pressure pHA is provided at the trailer brake pressure port 12. If, on the other hand, external braking signals are available, these are used in step St6 to thus brake the commercial vehicle 2 and the trailer 3.

On the right-hand side of FIG. 2 it is shown how the second signal S2 of the second operating element 24 is converted. If the second operating element 24 is actuated in step St10, the second signal S2 is provided. In step St11 it is then checked whether the commercial vehicle 2 is driving or stationary. If it is not driving, the trailer supply port 14 is vented in step St12 in order thus to apply the parking brakes of the trailer 3. However, if it is determined in step St11 that the commercial vehicle 2 is driving, a trailer brake pressure pHA is outputted at the trailer brake pressure port 12 in step St13 in order thus to brake the trailer 3 via the service brakes of the trailer 3. In this case, an anti jackknifing braking function is implemented.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 electropneumatic brake system
2 commercial vehicle
3 Trailer
4 spring brake port
5a, 5b service brake actuators on the VA
8a, 8b service brake actuators on the HA
8c, 8d service brake actuators on the ZA
10 trailer brake circuit
12 trailer brake pressure port
14 trailer supply port
20 manually actuatable operating unit
22 first operating element
23 first channel
24 second operating element
25 second channel
30 parking brake unit
32 first compressed air supply
34 second compressed air supply
40 trailer control unit
42 BUS connection
50 control module in the form of a structural unit
52a-52d wheel-speed sensors
54 additional cabling
100 central module
102 braking value sensor
104 front axle modulator
106a,
106b ABS valves on the front axle
108 pneumatic line
110 vehicle bus
112 vehicle bus
pAB trailer brake pressure
pAV trailer supply pressure
pB brake pressure from BST
pV supply pressure
VA front axle HA rear axle
ZA supplementary axle
SB braking signal
SVA front axle braking signal
S1 first signal
S2 second signal
SD speed signal
St1-St13 Steps

What is claimed is:

1. An electropneumatic brake system for a commercial vehicle which is provided for pulling a trailer, the electropneumatic brake system comprising:
    at least one service brake circuit configured to activate service brake actuators,
    a parking brake circuit having parking brake actuators on at least one axle of the commercial vehicle,
    a trailer brake circuit configured to provide a trailer brake pressure at a trailer brake pressure port and a trailer supply pressure at a trailer supply port, and
    a manually actuatable operating unit in a driver's cab of the commercial vehicle, the manually actuatable operating unit having a first operating element, which is associated with a first channel for providing a first signal, and a second operating element, which is associated with a second channel for providing a second signal,
    wherein, in the case of actuation of only the first operating element when the vehicle is driving, the parking brake actuators are activated and a trailer brake pressure is output at the trailer brake pressure port, and
    wherein, in the case of actuation of the second operating element when the vehicle is driving, only a trailer brake pressure is output at the trailer brake pressure port.

2. The electropneumatic brake system as claimed in claim 1, wherein in the case of actuation of the first operating element when the vehicle is stationary, the parking brake actuators are activated and the trailer supply port is vented, and
    wherein in the case of actuation of the second operating element when the vehicle is stationary, only the trailer supply port is vented.

3. The electropneumatic brake system as claimed in claim 1, further comprising a parking brake unit configured to actuate the parking brake actuators, the parking brake unit being connected to a first compressed air supply and the first channel for receiving and processing the first signal.

4. The electropneumatic brake system as claimed in claim 1, further comprising a trailer control unit being connected to the trailer brake pressure port and the trailer supply port and configured to provide the trailer brake pressure and the trailer supply pressure and further being connected to the second channel for receiving and processing the second signal.

5. The electropneumatic brake system as claimed in claim 4, wherein the parking brake unit and the trailer control unit are integrated into a common control module in the form of a structural unit.

6. The electropneumatic brake system as claimed in claim 5, wherein the control module is configured to receive speed signals directly or indirectly from at least one wheel sensor, and wherein the driving state and the stationary state of the commercial vehicle is determined from the speed signals.

7. The electropneumatic brake system as claimed in claim 1, wherein the first and second operating elements are in the form of buttons.

8. The electropneumatic brake system as claimed in claim 1, wherein the first and second operating elements are in the form of continuous displacement sensors.

9. A commercial vehicle having an electropneumatic brake system as claimed in claim 1.

10. The electropneumatic brake system as claimed in claim 1, wherein, in the case of actuation of the second operating element when the vehicle is driving, the trailer brake pressure output at the trailer brake pressure port implements an anti jackknifing braking function.

11. A method for controlling an electropneumatic brake system of a commercial vehicle, the method comprising:
    determining a driving state of the commercial vehicle;
    providing a first signal by a first operating element of a manually actuatable operating unit in a driver's cab of the commercial vehicle, the first operating element being associated with a first channel;
    in response to the first signal being received at a control device, activating parking brake actuators and outputting a trailer brake pressure at a trailer brake pressure port for secondary braking of the commercial vehicle, or of a vehicle combination comprising the commercial vehicle and a trailer connected thereto-;
    providing a second signal by a second operating element of the manually actuatable operating unit in a driver's cab of the commercial vehicle, the second operating element being associated with a second channel; and
    in response to the second signal being received at the control device or at a second control device, outputting a trailer brake pressure at the trailer brake pressure port for implementing an anti-jackknifing braking function.

12. The method as claimed in claim 11, further comprising:
    determining a stationary state of the commercial vehicle;
    providing the first signal; and
    in response to the first signal being received at a or at the control device:
    activating the parking brake actuators and outputting a trailer brake pressure at the trailer brake pressure port for immobilizing the commercial vehicle.

13. The method as claimed in claim 12, further comprising:
    providing the second signal; and
    in response to the second signal being received at a control device:
    venting the trailer supply port for immobilizing the trailer.

* * * * *